(12) United States Patent
Fawley

(10) Patent No.: US 11,161,725 B1
(45) Date of Patent: Nov. 2, 2021

(54) LIFT PADS WITH ALIGNMENT FUNCTIONALITY AND METHODS OF USING THE SAME

(71) Applicant: R. Bradford Fawley, Guilford, VT (US)

(72) Inventor: R. Bradford Fawley, Guilford, VT (US)

( * ) Notice: Subject to any disclaimer, the term of this patent is extended or adjusted under 35 U.S.C. 154(b) by 0 days.

(21) Appl. No.: 17/305,896

(22) Filed: Jul. 16, 2021

Related U.S. Application Data

(60) Division of application No. 16/838,505, filed on Apr. 2, 2020, now Pat. No. 11,084,697, which is a continuation of application No. PCT/US2020/013194, filed on Jan. 10, 2020.

(60) Provisional application No. 62/791,432, filed on Jan. 11, 2019.

(51) Int. Cl.
  *B60S 11/00* (2006.01)
  *B66F 7/26* (2006.01)
(52) U.S. Cl.
  CPC ................. *B66F 7/26* (2013.01); *B60S 11/00* (2013.01)

(58) Field of Classification Search
  CPC ...... B66F 7/26; B66F 1/00; B66F 3/00; B66F 5/00; B60S 11/00; B60S 9/00; B60S 9/22
  See application file for complete search history.

(56) References Cited

U.S. PATENT DOCUMENTS

| 8,690,125 B1 * | 4/2014 | Brake | B66F 7/28 |
| | | | 254/133 R |
| 2020/0283277 A1 * | 9/2020 | Fawley | G01B 11/27 |

* cited by examiner

*Primary Examiner* — Lee D Wilson
(74) *Attorney, Agent, or Firm* — Downs Rachlin Martin PLLC

(57) ABSTRACT

Lift pads with alignment functionality that enable a lift operator to objectively, easily and accurately position one or more, e.g., four, lift pads to ensure precise contact with the desired lift points and features of an object. Alignment functionality includes light emitting devices for illuminating an opposing surface, light beam detectors for detecting alignment, and image capture devices with machine vision capability for identifying features on opposing surface, among others.

12 Claims, 10 Drawing Sheets

LIFT PADS WITH ALIGNMENT FUNCTIONALITY AND METHODS OF USING THE SAME

RELATED APPLICATION DATA

This application is a divisional of U.S. patent application Ser. No. 16/838,505, filed on Apr. 2, 2020, and titled "Lift Pads With Alignment Functionality and Methods of Using the Same," which application is a continuation of International Patent Application No. PCT/US2020/013194, filed on Jan. 10, 2020, and titled "Lift Pads With Alignment Functionality and Methods of Using the Same," which application claims the benefit of priority of U.S. Provisional Patent Application Ser. No. 62/791,432, filed on Jan. 11, 2019, and titled "Lighted Lift Pads and Methods of Using the Same." Each of which is incorporated by reference herein in its entirety.

FIELD OF THE INVENTION

The present invention generally relates to the field of lift pads. In particular, the present invention is directed to lift pads with alignment functionality and methods of using the same.

BACKGROUND

FIG. 1A shows the underside of a vehicle 100 being supported by adjustable arms 102a-102d of a two post type vehicle lift 103. Vehicle lift 103 is a type of lifting device that is commonly used by commercial and private garages to hoist vehicles such as vehicle 100 in order to perform repairs and maintenance. Vehicle lifting devices also include lifts and jacks that may be used to raise, lower or support other heavy objects, such as motorized or non-motorized and mobile or immobile automobiles, trucks, airplanes, boats, mobile homes, trailers, pre-fabricated homes and motorcycles and the devices and methods disclosed herein are applicable to these and any of a variety of other types of vehicles. The four arms 102 are adjustable and configured to extend and retract as well as swing in a wide radius so that lift pads 104a-104d located at the end of each arm on which the lifted vehicle 100 rests may be positioned at a wide variety of locations beneath a wide variety of lift points for a wide variety of vehicles. Vehicle 100 has four specified or desired optimal lift points 106a-106d. The specific location of lift points 106 depend on the specific characteristics of vehicle 100, such as shape, construction, structure and distribution of weight such that each time lift 103 is used to raise a vehicle, the position of arms 102 need to be adjusted so that lift pads 104a-104d will engage the desired or optimal lift points 106a-106d. Further, because a vehicle 100 to be lifted is typically driven, pushed or rolled into a garage bay where a lift 103 is installed and because variations in the position of the vehicle 100 within the garage bay are inevitable due to an operator's perception and judgment, each time lift 103 is used to raise a vehicle that has been positioned or re-positioned in the garage bay, the position of arms 102 need to be adjusted so that lift pads 104a-104d will engage the desired or optimal lift points 106a-106d. In other prior art examples, lifting devices may include any mechanism for lifting a vehicle, such as a scissors lift, floor jack, bottle jack, jack stand or screw jack (not illustrated) or combination thereof, which may be used to raise and support a vehicle at one or more lift points. Lift pads may be used with any of the foregoing vehicle lifting devices. Lift pads 104 typically are made of a durable resilient material, such as hard rubber or polyurethane, but can be made of metal and other materials, and are configured to sit on or be incorporated into a steel frame or bracket of the lift arms 102 to provide stability, assist in holding the vehicle frame in place and help prevent scratches, dents and other damage to the vehicle and its frame. Lift pads and the frame or bracket of the lift arms 102 may be configured to independently or jointly be further laterally adjustable by means of rotation or sliding so that the lift pad may be positioned on the lift arms 102 relative to the features of the vehicle at the lift points 106a-106d. Lift pads 104 come in a variety of thicknesses, shapes and sizes, such as discs, squares or rectangles. As shown in FIG. 1B, the illustrated prior art lift pads 104 may include a recess 110 that is sized to accommodate seams 112 or other features of particular vehicles. Some lift pads have recesses that are particularly shaped or configured to fit a particular make or model vehicle. Lift pads 104 have recess 110 so that the weight of the vehicle does not rest on the seams 112 because the seams may not be designed to support that type of weight load and would be deformed, bent or crushed, for example, if a lift pad without recess 110 was used to lift vehicle 100 at the specified or desired lift points 106a-106d for that vehicle. Arms 102 can be raised and lowered by lift 103. The vertical position of lift pads 104 can be further adjusted rotationally and axially by means of a threaded connection 114 or stacking lift pads on each other. Some prior art lift pads may sit on cylindrical extenders (not illustrated).

To place the four lift pads 104 precisely on the optimal or desired lift points 106, a lift operator typically needs to get on his or her knees near the position of one of the four lift points 106, look under the vehicle and position the corresponding arm 102 and lift pad 104 in the approximate position beneath the lift point 106. Depending on the position of vehicle in the garage bay, the features of the vehicle and the location of the lift point, the distance from the lift pad to the lift point on the vehicle may range from several inches to a foot or more. While looking under the vehicle 100 to position the lift pad 104 beneath the lift point 106 so that the lift pad 104 will engage the vehicle at the desired lift point 106 and accommodate or avoid the features of the vehicle at and near the lift point 106 with the shape of the lift pad 104, it can be difficult for a lift operator to accurately judge where the surface area of the lift pad 104 will make precise contact with the desired lift point 106 and the features of the vehicle at and near the desired lift point 106. It can be important in some cases to ensure that the entire surface area of the point of contact of each lift pad 104 contacts the vehicle 100 in the correct location and orientation because failing to position and orient the lift pad 104 to make contact in the proper location can damage features and components on the vehicle such as crushing oil, electrical and hydraulic lines, unibody or other seams such as seam 112, frame features, suspension parts, rocker panels and other components that are near the specified lift points. Improperly located and oriented lift pads 104 can also pose a safety risk, making the lifted vehicle 100 unstable and unsafe and present a serious safety risk for the lift operator and others who may be working near or under the vehicle. Improperly located and oriented lift pads that make the lifted vehicle 100 unstable can also pose a risk of damage to the vehicle and the lift. With floor jacks and jack stands, the same process is followed but with only one jacking point per floor jack or jack stand.

To ensure that each of the four lift pads 104 in a two post lift 103 makes contact with the desired lift points 106, the lift operator needs to move around the vehicle, get down on his knees and try to adjust and orient each lift pad in the location he believes will result in the proper point of contact with the vehicle once the lift arms of the lift are raised. Further, the pad 104 may need to be rotated or aligned to meet up with or avoid features on the bottom of the vehicle 100 such as seams, frame members and oil lines. Typically, after initially positioning the four arms 102 and the four lift pads 104, the lift operator will move to one of the lift posts (not illustrated) where the lift controls are located and engage the lift to attempt to raise the arms slightly to a position that causes the lift pads to come very close to or actually slightly engage the desired lift points 106. The operator then typically revisits each of the four lift locations, kneels down and looks under the vehicle 100 to determine whether or not his initial adjustment and orientation of the arms 102 and lift pads 104 actually will contact the vehicle 100 only on the desired lift points 106 and in an orientation that accommodates the features of the lift pad shape with the shape of the features of the vehicle at the lift points 106. This may again require lowering or raising the lift arms and adjusting, sliding or rotating the lift pads 104 to ensure a rectangular, slotted or other shape of lift pad or a plain disc will engage the vehicle and its features at the correct location and orientation. If the inspection reveals that further adjustment is required at any of the four lift points 106, adjustment is made. This may again require lowering or raising the arms 102 and beginning the process again. Successfully engaging each of the lift pads 104 in the desired orientation and location with each of the lift points 106 depends on the exercise of subjective judgement and estimation by the lift operator. The ability of the operator to accurately judge whether the positioned and oriented lift pads 104 will engage the lift points 106 as desired will vary depending on the operator's visual perception, the lighting beneath the vehicle, the experience of the operator and the time and effort expended by the operator. Once the operator believes in his subjective judgment that he has adjusted the lift arms 102 and lift pads 104 in the proper position and orientation relative to the vehicle features, the operator will return to the lift controls (not illustrated) and engage the lifting mechanism to raise the vehicle 100. For safety, it is recommended that once a vehicle has been lifted a few feet, the operator should make a further inspection to ensure that each of the lift pads 104 are properly engaged at the correct lift points 106 in the proper orientation relative to features of the vehicle and the vehicle 100 is stably supported with no damage to its components.

This entire process is time consuming and requires an operator to move around the vehicle several times and get up and down many times. Moreover, because the process is influenced by many factors such as variety of vehicles and models, lighting, position of a vehicle in a garage bay, variation of lifts and their features and the experience of the lift operator, the successful and safe use of the lift to lift a vehicle requires the exercise of subjective judgment that can vary widely each time a vehicle is lifted. For a commercial garage that is lifting a wide variety of vehicles and whose operators may be time pressured, the time that is spent on this process can be costly and, if not done correctly, may present dangers to employees and others and result in damage to vehicles. The same inefficiencies, risks and dangers are presented to do it yourselfers in their home garages who less often use a lift and may be less experienced in making the multiple subjective judgment calls needed to safely and successfully lift a vehicle.

SUMMARY OF THE DISCLOSURE

In one implementation, the present disclosure is directed to a lift pad for use with a lifting device for lifting an object. The lift pad includes a body having a contact surface that is configured to make contact with an object when the lift pad is disposed on a lifting device or make contact with a lifting device when the lift pad is coupled to an object; and a projection unit configured to project an alignment beam for providing a light indication on an opposing surface, the alignment beam configured to indicate a point on the opposing surface that is aligned with an outer extent of the contact surface or laterally outward of the outer extent of the contact surface.

In another implementation, the present disclosure is directed to a system. The system includes the lift pad of claim 1; and a target configured to be coupled to the object, the target including a detector configured to detect a location of the alignment beam when the alignment beam is incident on the detector.

In yet another implementation, the present disclosure is directed to a vehicle. The vehicle includes a lift point, the lift point defining a location for a lift to engage the vehicle to lift the vehicle; and a projection unit operably coupled to the vehicle, the projection unit configured to project an alignment beam for providing a light indication on a lift when the lift is positioned below the vehicle for aligning the lift with the lift point.

In yet another implementation, the present disclosure is directed to a method of lifting an object with a lifting device and a lift pad, the lift pad having a projection unit and a body that includes a contact surface, the contact surface configured to make contact with the object when the lift pad is disposed on the lifting device or make contact with the lifting device when the lift pad is coupled to the object. The method includes positioning the lifting device below the object, wherein the lift pad is disposed on the lifting device or coupled to the object; projecting an alignment beam from the projection unit, the alignment beam forming a light indication on an opposing surface, the light indication indicating at least one of a point on the opposing surface that is aligned with an outer extent of the contact surface; a point on the opposing surface that is laterally outward of the outer extent of the contact surface; a rotational position of the lift pad with respect to the opposing surface; or a point on the object that is aligned with a feature in the lift pad, the feature configured and dimensioned to receive a feature of the object when the surface contacts the object; adjusting a position of the lifting device until the light indication illuminates a portion of the lifting device or object corresponding to an alignment of the lifting device with a lift point of the object; raising the lifting device until the lift pad makes contact with the lift point or the lifting device makes contact with the lift pad; and lifting the object with the lifting device.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include lift pads with alignment functionality that enable a lift operator to easily, objectively and accurately position one or more, e.g., four lift pads to ensure precise contact with the desired lift points of an object, such as a vehicle, in a desired orientation relative to the features of the object without subjective guess work and multiple rounds of inspection and adjustment of position and orientation before lifting the object. A lift operator may be a human or a computer controlled robot that is configured to operate, position and orient a lift and its arms and lift pads. As described more below, lift pads of the present disclosure may include a variety of features for objective alignment functionality, such as light emitting devices for illuminating an opposing surface, light beam detectors for detecting alignment, and image capture devices with machine vision capability for identifying features on an opposing surface, among others.

Figure 1:
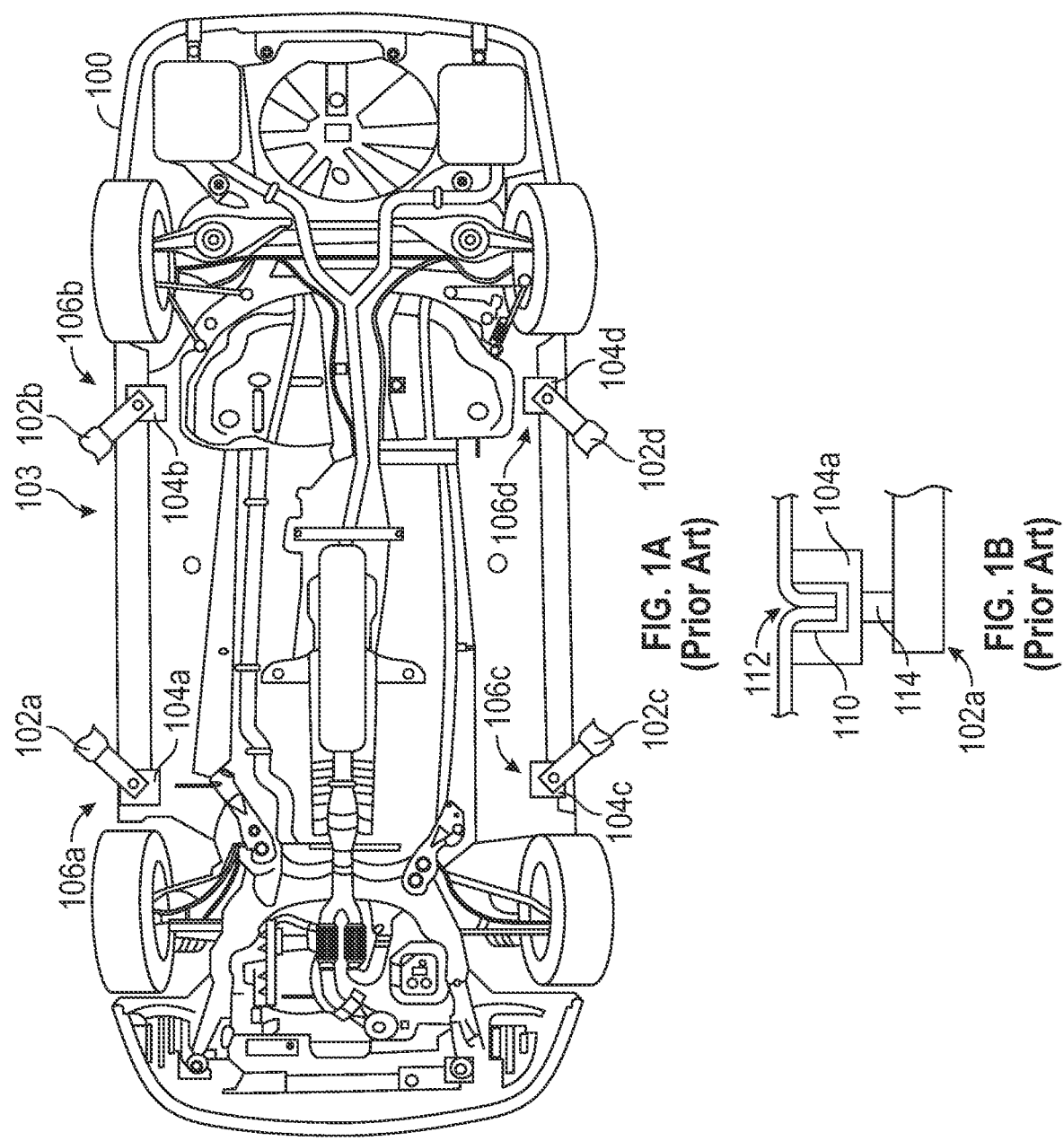
FIG. 1A illustrates the underside of a vehicle being supported by adjustable arms of a two post type vehicle lift with prior art lift pads.
FIG. 1B shows a side view of one of the conventional lift pads of FIG. 1A engaged with a lift point of the vehicle frame.
Figure 2:
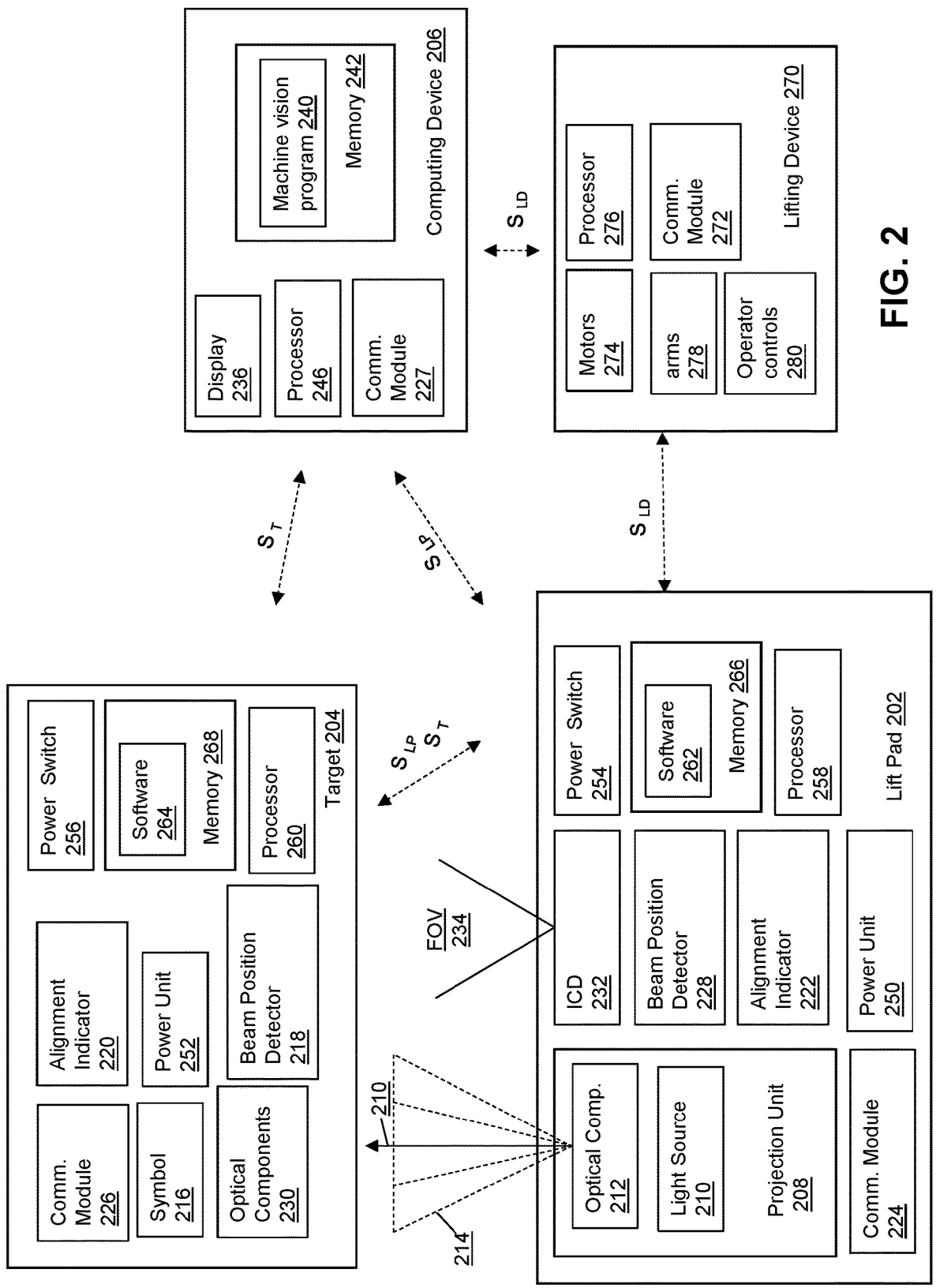
FIG. 2 is a functional block diagram of a lift pad system.

FIG. 2 illustrates a functional block diagram of one example of a lift pad system 200 made in accordance with the present disclosure. In the illustrated example, system 200 includes a lift pad 202 configured with alignment functionality to enable a lift operator to easily and accurately position and orient the lift pad for precise contact with a desired lift point and features of a vehicle, such as one of lift points 106 of vehicle 100 (FIG. 1). System 200 also includes a target 204 that may be coupled to a lift point on the underside of a vehicle and used in combination with lift pad 202, and system 200 also includes a computing device 206 that may be configured to communicate with or control one or both of the lift pad and target and otherwise provide computational and display functionality. In some examples, lift pads made in accordance with the present disclosure may be designed and configured to support all or a portion of the weight of an object that weighs more than 2,000 lbs, and in some examples, more than 5,000 lbs and in some examples, an object weighing between 2,000 lbs and 10,000 lbs in the process of lifting the object, where one or more of the lift pads are disposed between the object and a corresponding respective lift or portion of a lift while the object is being lifted.

In the illustrated example, lift pad 202 includes a projection unit 208 that is configured to project an alignment beam 210 for providing a light indication on an opposing surface, such as the underside of a vehicle to indicate a location on the opposing surface in alignment with and oriented to the shape and features of the lift pad 202 and its projection unit 208. Projection unit 208 includes a light source, such as a light emitting diode or laser diode, and optical components 212 for forming alignment beam 210. Optical components 212 can include any of a variety of optical components known in the art, such as lenses, mirrors, apertures, filters, active optical elements and combinations thereof. In some examples, optical components 212 include at least one collimator which may include, for example, a focus lens, that may be in the form of an aspheric lens. Alignment beam 210 may be a single or multiple concentrated beams of light, such as a laser beams of light for forming a light indication in the form of one or more discrete points of light on an opposing surface. In other examples, optical components 212 may be configured to emit one or more alignment planes of light 214 for forming a light indication in the form of one or more discrete lines of light on an opposing surface, for example, at least one additional optical element to form a shaped beam from the collimated beam. In yet other examples, optical components 212 may be configured to emit any of a variety of other shapes of alignment beams for forming light indications of other shapes, such as a cross, star, grid or triangle, etc., utilizing optical techniques known in the art.

As described more below, in some examples, lift pad 202 may be positioned and oriented on a lift arm, such as lift arm 102 in place of a prior art lift pad, such as lift pad 104 (FIG. 1A). In examples where lift pad 202 is located and oriented on a lift arm, alignment beam 210 or 214 may be used to form a light indication on the features of the underside of a vehicle to indicate a position on the features of the underside of the vehicle in alignment with a particular location of the lift pad. Thus, an operator can use lift pad 202 to quickly and easily align and orient the surface contact features of the lift pad with a desired location of the surface contact features of the vehicle, such as lift points 106 (FIG. 1A) by moving, e.g., rotating and extending/restricting the lift arm and/or moving the lift pad until the light indication formed by alignment beam 210 is at a desired location and orientation with respect to the lift point and the features of the vehicle. In other examples, lift pad 202 may be coupled to the underside of a vehicle at a lift point of the vehicle, for example, to become the lift point of the vehicle. For example, lift pad 202 may be configured to be integrated with or attached before or after manufacture of the vehicle to the underside of a vehicle by any coupling means, such as welding, magnets, adhesives, brackets, bolts, or screws. In examples where lift pad 202 is integrated with or attached to the vehicle, alignment beam 210 may form a light indication on an opposing lift arm and/or lift pad of a lift positioned below lift pad 202 and the operator can quickly and easily move and orient the lift arm until the lift arm and the lift pad located on the lift arm are in a desired position with respect to lift pad 202.

As shown in FIG. 2, system 200 may also include a target 204 that may be used with lift pad 202 for aligning and orienting the lift pad relative to a vehicle lift point and/or vehicle features or a lift arm. Target 204 may be configured to be coupled to either the underside of a vehicle or a lift arm for being positioned and oriented opposite lift pad 202 for facilitating the alignment and orientation of lift pad 202. For example, target 204 may be configured to be coupled to a lift point of a vehicle, such as lift point 106 of vehicle 100 (FIG. 1A) and may include a symbol 216 having any shape, such as a cross, triangle, circle, or combinations thereof that may be used as a target for aligning alignment beam 210 with the features of the target. In some examples, target 204 may also include a laser beam position detector 218 for detecting a position of a laser beam incident on the detector, also referred to herein as determining a location of incidence of the beam on the detector, such as alignment beam 210, for aiding alignment and orientation. Laser beam position detector 218 may have any of a variety of configurations known in the art. In one example, laser beam position detector includes photodiodes configured to provide an analog output directly proportional to the position of a light spot on the detector active area. Target 204 may also include an alignment indicator 220 configured to receive a signal generated by laser beam position detector 218 and provide an indication of alignment and orientation, for example, in the form of a visual and/or audible indication of alignment and orientation when alignment beam 210 is incident on detector 218. Target 204 may be communicatively coupled with lift pad 202 and computing device 206 using wired or wireless communication for sending signals, ST to the computing device and/or lift pad, including signals according to an output of laser beam position detector 218, which may be displayed on display 236 of the computing device and/or processed by the computing device or lift pad.

In some examples, lift pad 202 may also include an alignment indicator 222 configured to receive a signal generated by laser beam detector 218 and provide an indication of alignment and orientation. For example, lift pad 202 and/or target 204 may each include communication modules 224, 226 for wired or wireless communication between the lift pad and target and with communication module 227 of computing device using any communication protocol and means known in the art, such as visible light communication, near field communication, Bluetooth, or WIFI, etc. Thus, by coupling target 204 to the underside of a vehicle and positioning and orientating lift pad 202 on a lift arm below the vehicle, an operator can move the lift arm until alignment beam 210 is incident on laser beam position detector 218 and be notified when the lift pad is aligned by audible, e.g., beeping, and/or visual, e.g., a light indication on a light indicator, when the lift pad and target are aligned. In some examples, lift pad 202 may include a laser beam position detector 228 instead of or in addition to laser beam position detector 218 for detecting alignment. For example, target 204 may include an optical component 230, such as one or more mirrors, for reflecting alignment beam 210 back to lift pad 202 for detection by laser beam position detector 228 and indication by alignment indicator 222.

Lift pad 202 may also include an image capture device (ICD) 232 for capturing images of objects located in a field of view (FOV) 234 of the ICD. ICD 232 may be any device configured to capture digital images, such as a still camera (e.g., a camera configured to capture still photographs) or a video camera (e.g., a camera configured to capture moving images including a plurality of frames), and may be integrated, in part or in whole, with lift pad 202. The images can be permanently (e.g., using non-volatile memory) or temporarily stored (e.g., using volatile memory), depending on a given application, so that they can be analyzed by computing device 206, as further described herein. In an example embodiment, ICD 232 is a single or high resolution (megapixel) camera that captures and processes real-time video images of objects located in FOV 234. In accordance with some embodiments, ICD 232 can be configured to operate using light, for example, in the visible spectrum, the infrared (IR) spectrum, or the ultraviolet (UV) spectrum, among others. Componentry of ICD 232 (e.g., optics assembly, image sensor, image/video encoder) may be implemented in hardware, software, firmware, or a combination thereof. In some examples, ICD 232 may be used to capture and display images, for example, on a display of computing device 206. For example, lift pad 202 may be communicatively coupled with computing device 206 using wired or wireless communication for sending signals, SLP to the computing device, including signals encoding images captured by ICD 232, which may be displayed on display 236 of the computing device.

Computing device 206 may include, for example, a mobile computing device in the form of one or more of a laptop, mobile phone, and tablet or any combination thereof located, for example, next to a lift, and that is configured to display images captured by lift pad 202 to facilitate aligning the lift pad with the lift point of a vehicle. In one example, an operator may place one of lift pads 202 on each of four arms of a lift, such as arms 102 of lift 103 (FIG. 1A). Display 236 may display images from each ICD 232, which may include an image of each alignment beam 210 forming a light indication on an underside of the vehicle. In another example, ICD 232 or computing device 206 may overlay an indicator on the images captured by the ICD to indicate an alignment position of the lift pad relative to the images captured. The indicator may be one or more points corresponding to a location on the lift pad with respect to the vehicle frame and its features, where the actual location of the points are converted to pixel space coordinates for augmenting the image captured by the ICD. As described more below, lift pad 202 may include a raised surface or body configured to come into contact with the vehicle, the raised contact surface having an outer shape and in some examples, also having one or more contact or non-contact recesses. The images captured by ICD 232 may be augmented with an outline of the raised contact surface of lift pad 202 for quickly visualizing whether the raised contact or recessed surface of the lift pad is aligned and oriented with the desired lift point and features of a vehicle or lift arm of a lift. An operator can then simultaneously view a current alignment and orientation of all four lift pads 202 on display 236 to confirm all four lift pads are aligned and oriented as desired. The operator can also continue to simultaneously view the alignment in real time by viewing the images captured by each ICD 232 on display 236 as he raises the lift until the lift pads 202 make contact with the vehicle.

In some examples, computing device 206 may also include a machine vision program 240 stored in memory 242 for execution by processor 246 for processing images captured by ICD 232. For example, machine vision program 240 may include instructions for detecting features captured by ICD 232, such as features located on the underside of a vehicle, a lift pad, or target 204, and determining an alignment and orientation of the ICD with respect to the features. In one example, machine vision program 240 may include instructions for detecting a lift point, such as one of lift points 106 (FIG. 1A), determining a location of the lift point in pixel space of the ICD, determining a location in the image that is aligned and/or oriented with and relative to the lift pad and its features, determining an offset distance between the two locations, and providing an indication of alignment and rotational position according to the determined offset. Computing device 206 may provide an indication of alignment and rotational position, for example, as a visual and/or audible indication when the lift pad 202 is aligned and oriented as desired with the lift point and the features of the vehicle.

In some examples, machine vision program 240 may be configured to detect a unique symbol, such as symbol 216, which may be easier and less computationally intensive then detecting a lift point in a vehicle frame. In examples where machine vision program 240 includes instructions to detect symbol 216, symbol 216 can incorporate any technique for displaying a computer-vision-recognizable or machine-readable pattern capable of being captured by ICD 232. For example, symbol 216 may include any shape printed on a substrate with visible or invisible (e.g., fluorescent) ink or an object having a unique three-dimensional shape. In some examples, symbol 216 may include a one or two-dimensional bar code that machine vision program 240 is configured to detect. Symbol 216 may also be displayed by one or more light emitting elements of target 204, and the symbol 216 can include display of unique patterns in visible or non-visible (e.g., infrared) light, and/or temporal patterns emitted by one or more light emitting elements.

Machine vision program 240 may include instructions for causing processor 246 to analyze images received from ICD 232 and identify symbol 216 and determine an alignment of lift pad 202 with respect to symbol 216. Any of a variety of known computer vision techniques and techniques developed in the future may be employed for detecting symbol 216 or another object in a captured image, such as a lift point. In one example, machine vision program 240 may employ standard image processing techniques to identify symbol 216 or other predefined object. In one example, machine vision program 240 may include image acquisition, pre-processing, for example, to reduce noise and enhance contrast, feature extraction, segmentation of one or multiple image regions which contain a specific object of interest, and further processing of the processed images to identify symbol 216 or other predefined object and determine an alignment and/or orientation of the lift pad relative to the symbol.

In one example, machine vision program may include instructions to receive an image captured by ICD 232, detect a predefined object in the image, such as symbol 216 or a lift point on a vehicle, or other feature on the vehicle, determine an alignment of the lift pad 202 with the detected predefined object, and provide an indication of the determined alignment to an operator.

Lift pad 202 and target 204 may each include a corresponding power unit 250 and power unit 252 for providing electrical power to the components of the lift pad and target. Power units 250 and 252 may include batteries and/or be configured for receipt of electrical power from an external source, for example, via a wired connection. Lift pad 202 and/or target 204 may also include a power switch 254, 256 for turning one or more components of the lift pad or target on or off. In some examples, power switch 254 or power switch 256 is configured to switch to off when lift pad 202 comes into contact with the underside of the vehicle or target or incorporate a timer, for example, to conserve battery power. Power switch may include any proximity, contact, and/or pressure switch technology known in the art for detecting when lift pad 202 makes contact with the vehicle or target. Lift pad 202 and/or target 204 may each include a processor 258, 260 for executing instructions in software or firmware 262, 264, stored in memory 266, 268 for controlling one or more components of the corresponding device.

System 200 may also include a robotic lifting device 270 for automatically adjusting a position of lift pad 202 to align the lift pad with a lift point of a vehicle according to signals generated by one or more alignment components of the lift pad described herein. In the illustrated example, robotic lifting device 270 may include a communication module 272 for wired or wireless communication with any of the other components of system 200, and may also include one or more motors 274 for moving one or more structural components of the lifting device 206 and a processor 276 for controlling the motors and other components of the robotic lifting device. In one example, lifting device 270 is a two post and scissors type vehicle lift similar to lift 103 (FIG. 1A) having four arms 278 that rotate and extend/retract in a similar manner to arms 102 (FIG. 1A). One of lift pad 202 may be placed on each of the four arms 278 and motors 274 may be operably coupled to each of the four arms to control a position and extension of the arms. In some examples, beam position detectors 218/228 may be communicatively coupled with lifting device 270 for sending control signals to the lifting device to control motors 274 to adjust a position of arms 278 and lift pads 202 disposed on the arms to align and/or orient the lift pads with lift points on a vehicle. In some examples, computing device 206 and/or lift pad 202 may be communicatively coupled with lifting device 270 for sending control signals to the lifting device to control motors 274 to adjust a position of arms 278 and lift pads 202 disposed on the arms according to an alignment determination made by a processor executing machine vision program to align and/or orient the lift pads with lift points on a vehicle. In some examples, lifting device 270 may include operator controls 280 for allowing an operator to manually control a position of arms 278 to align lift pads 202 with vehicle lift points.

As noted above, in some examples, lift pad 202 may be configured to be coupled to the underside of a vehicle, for example, at the vehicle's lift point, rather than positioned on a lift, such as on a lift arm. In such an example, the lift arm may have no lift pad, or may have a conventional lift pad 104 (FIG. 1A), or target 204 may be positioned on the lift arm. Whether positioned on a lift arm or coupled to a vehicle, one or both of lift pad 202 and target 204 may be configured to be removably coupled to the corresponding vehicle or lift arm and remain in place when the vehicle is lifted. For example, both lift pad 202 and target 204 may have a durable construction similar to conventional lift pads and formed from durable and resilient materials configured to resist the high pressures that occur during the lifting of the vehicle. In some examples, one or both of lift pad 202 and target 204 may be configured to be removed from the lift arm or vehicle after alignment is achieved and before the lift arm is lifted to engage the vehicle. In some examples, an example of a lift pad 202 that is configured to be disposed on a lifting device or coupled to a vehicle to determine an alignment of the lifting device with the vehicle and then removed from the lifting device or the vehicle before lifting the vehicle may also be referred to herein as an alignment device. Such examples of alignment devices may provide a more economical approach than using a plurality of lift pads 202. For example, a conventional lift pad 104 (FIG. 1A) may be used with a lifting device and a single alignment device with one or more of the components and functions of lift pad 202 may be coupled to one lift point or positioned on top of a conventional lift pad 104 and used to align a lifting device with the lift point, and after alignment, the alignment device can be moved to the next lift point or lift arm or lifting device to align the next arm of the lifting device or second lifting device with the next lift point. The process may be repeated until all arms of a lifting device or each lifting device are/is properly aligned with corresponding respective lift points of the vehicle. A single alignment device can, therefore, be used to align each of a plurality of arms of a lift with corresponding lift points and the single alignment device does not need to be able to withstand the weight of a vehicle because it can be removed prior to lifting the vehicle. In yet other examples, one or both of lift pad 202 and target 204 may be integrally formed with the lift arm or vehicle and be an original equipment manufacturer (OEM) component. For example, a vehicle frame may include one or more components of target 204 or lift pad 202 integrally formed therein. For non-limiting example, one or more lift points of an automobile frame may include one of projection units 208 for forming a light indication with alignment beam 210 on a lift arm, one of lift pads 202 disposed on the lift arm, or a conventional lift pad 104 disposed on the lift arm. In such an example, the projection unit may be powered by the automobile.

Lift pads and targets made in accordance with the present disclosure may include any combination of components and functions described herein as well as additional components and functions. For example, lift pads made in accordance with the present disclosure may include any combination of one or more of projection units 208, ICD 232, and/or laser beam detector 228. Similarly, targets made in accordance with the present disclosure may include any combination of one or more of symbol 216 and/or laser beam position detector 218. In some examples, target 204 may be configured as a low-cost consumable device, such as a sticker with symbol 216 printed thereon for use in connection with lift pad 202. In yet other examples, embodiments of lift pad 202 are configured to be used in pairs, with one lift pad positioned on a lift arm and another one of the lift pads coupled to a vehicle. In such embodiments, the pair of lift pads may have different components and configurations or the same components. In other embodiments, one or more components of lift pad 202 may be located in or directly coupled to a lift, such as a lift arm rather than directly coupled to or embodied in a lift pad. For example, in some embodiments, one or more projection units 208 may be located on or in a lift arm adjacent lift pad 202 instead of or in addition to projection units located in the lift pad. In some examples, one or more components of lift pad 202 may be located in or directly coupled to a lift, such as a lift arm for use with a conventional lift pad, e.g., prior art lift pad 104.

Figure 3B:
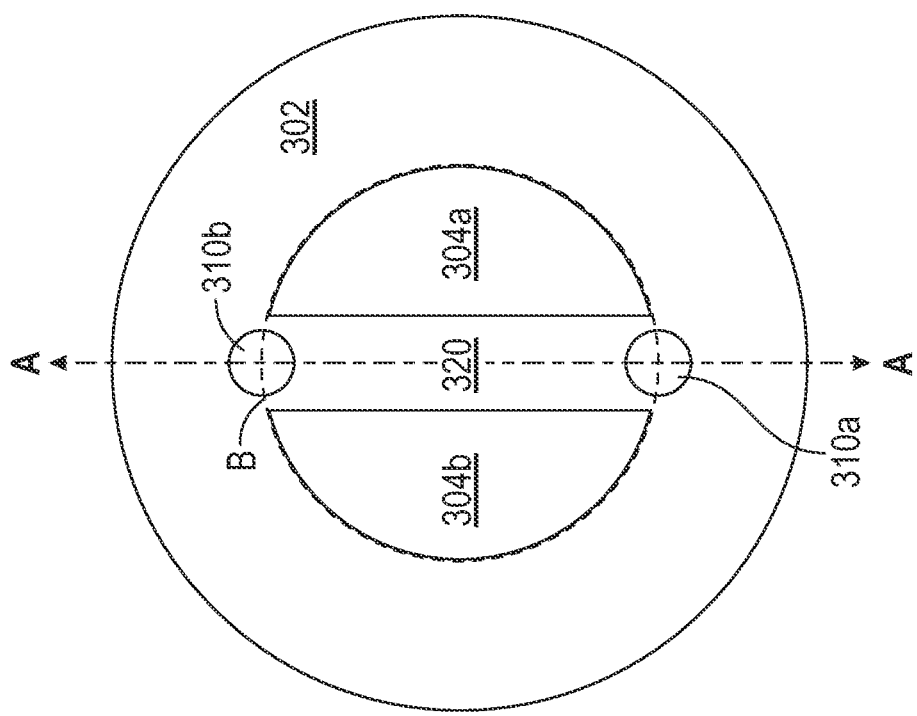
FIG. 3B is a top view of the lift pad of FIG. 3A.
Figure 3A:
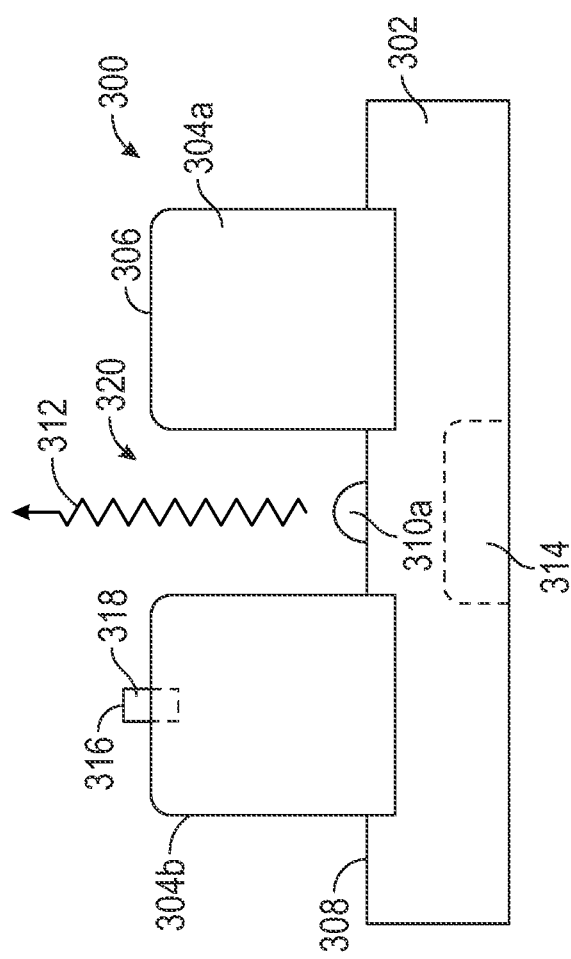
FIG. 3A is a side view of a lift pad.

FIGS. 3A-3F illustrate an example lift pad 300 made in accordance with the present disclosure. FIG. 3A is a side view of lift pad 300 and FIG. 3B is a top view of the lift pad. In the illustrated example, lift pad 300 includes a base 302 and a body 304 that stands proud of the base, the body defining a contact surface 306 configured to make contact with the features of a vehicle frame and the base defining a recessed surface 308 that is recessed with respect to the contact surface 306. Recessed surface 308 is configured and dimensioned to be spaced from the vehicle and not make contact with the vehicle when the lift pad is engaged with the vehicle frame and the vehicle is being lifted. Body 304 is made of a durable material configured to come into contact with and support the weight of a vehicle such as an automobile and may be constructed from any material known in the art, including materials commonly used for conventional lift pads such as hard rubber. Base 302 may be integrally formed with body 304 or may be a separate component and may be made of the same or different material than body, such as hard rubber or metal. As shown in FIGS. 3A and 3B, body 304 includes a first portion 304a and a second portion 304b that are spaced apart, thereby defining an elongate recess 320 that is configured and dimensioned to receive sensitive vehicle components or features located below or near a contact surface of a lift point of a vehicle's frame, such as a seam or may be used as described below to house and protect alignment features of the lift pad that may be damaged if they made contact with the vehicle. In other examples, body 304 may be formed from a single component, such as a single piece of hard rubber that includes recess 320 formed therein. In yet other examples, body 304 may not include a recess. In some examples, body 304 may be designed as a consumable component that is removeably coupled or positioned to or on base 302 such that the body 304 can be easily replaced after becoming worn from use.

Lift pad 300 also includes two projection units 310a and 310b disposed in base 302 that are each configured to project an alignment beam 312 for providing a light indication on an opposing surface, such as the underside of a vehicle to indicate a location on the opposing surface in alignment and oriented with the corresponding projection unit. Projection units 310 may have any of the configurations described herein, for example, any of the configurations of projection unit 208 of FIG. 2. In one example, each of projection units 310 include a laser diode and collimating optics for forming alignment beam 312 in the form of a collimated laser beam for forming a light indication in the form of a discrete spot of light on an opposing surface, such as a vehicle frame. In the illustrated example, projection units 310 are shown protruding slightly from recessed surface 308 but protruding by a distance that is less than a distance between a seam or other component of a vehicle and recessed surface 308 when the seam or other component is disposed in recess 320. In other examples, projection units 310 may be fully recessed within base 302 and not protrude from recessed surface 308.

Lift pad 300 also includes a battery 314 for powering the projection units 310 and a power switch 316 for turning the projection units 310 on and off. In the illustrated example, switch 316 includes a moveable actuator disposed in a recess of body 304 and resiliently biased towards an extended position as shown in FIG. 3A. When contact surface 306 of body 304 comes into contact with a vehicle frame, actuator 318 is pushed into the body, thereby actuating switch 316 and disconnecting projection units 310 from battery 314 to thereby conserve battery power after lift pad 300 has made contact with a vehicle and the vehicle is in the lifted position. Lift pad 300 may include an additional switch (not illustrated) for manually turning off the projection units 310 when the lift pad is not in use. Lift pad 300 may also include a timer (not illustrated) for turning off the projection units 310 to conserve battery power.

As shown in FIG. 3B, in the illustrated example, projection units 310 are located approximately at the intersection of a central longitudinal axis, A, of elongate recess 320 and boundary line, B, extending around an outer extent of body 304. By aligning the projection units 310 with recess 320, the alignment beams 312 of the two projection units provide a rotational position indication of the lift pad 300, which is useful for orienting and aligning recess 320 with sensitive or other vehicle components, such as a seam of a vehicle. And by positioning projection units 310 proximate boundary line B or radially or laterally outward of boundary line B, the alignment beams 312 of the two projection units provide an indication of an outer lateral extent of body 304 and an indication of an outer extent of contact surface 306, which is useful for aligning the lift pad contact surface with the vehicle and its features to engage vehicle features or avoid sensitive vehicle components, such as a seam, fuel or oil line of the vehicle. The position of projection units 310, therefore, enable the precise alignment of lift pad 300 relative to sensitive or other vehicle features and components which enables fast, objective and easy alignment and orientation of the lift pad for lifting a vehicle even if the lift point of the vehicle is relatively small and in close proximity to sensitive or other components and features. By providing alignment beams 312 at the lateral extent of body 304, an operator does not need to subjectively and conservatively overshoot the orientation and position of the lift pad with a sensitive or other vehicle component or feature to ensure the desired contact point is achieved or that the sensitive component is not crushed. Instead, an operator can objectively, confidently and precisely align and orient the lift pad with a lift point and the features of the vehicle knowing the alignment beams indicate the edge of the surface contact portion of the body 304 of the lift pad 300 and will not inadvertently clip and damage the sensitive component or fail to accurately engage the lift point surface and the vehicle's features at the desired contact point. Such an indication can also provide significant safety benefits because a misaligned lift pad (for example, misaligned to ensure it avoids a sensitive component adjacent a lift point but as a result not accurately aligned with the lift point) could result in an inadequately supported vehicle, which could lead to the vehicle falling off of the lift, resulting in damage to the vehicle and the lift and potentially fatal injury to an operator or persons nearby.

In other examples, lift pad 300 may have only one or more than two projection units 310. For example, lift pad 300 may have additional projection units located in base 302 along the length of recess 320 and/or may also have additional projection units located in base 302 around the perimeter of body 304. In some examples, one or more of projection units 310 may have optical components for forming an alignment beam other than a single concentrated beam. For example, optical components configured to emit an alignment plane of light similar to alignment plane of light 214 (FIG. 2) for forming a light indication in the form of a discrete line of light on an opposing surface such as a vehicle frame. For example, one projection unit may be located in recess 320 and form a line of light substantially aligned with central longitudinal axis A for forming a line of light on the vehicle frame indicating a rotational position and alignment of recess 320 with respect to the vehicle frame and its features.

In the illustrated example, body 304 has a circular outer shape and includes two portions (304a, 304b) that define recess 320. In other examples, body 304 and recess 320 may have virtually any shape, including any outer shape, for example, circular, square, rectangular, elliptical, etc. Body 304 may have more than one recess, or no recesses, and in the case of multiple recesses, the recesses may be parallel to each other, perpendicular, or any other angle, may be elongate extending across an entire width of the body, or have a shorter length. Recess 320 may be in the shape of a cylindrical cut out in body 304.

Figure 3D:
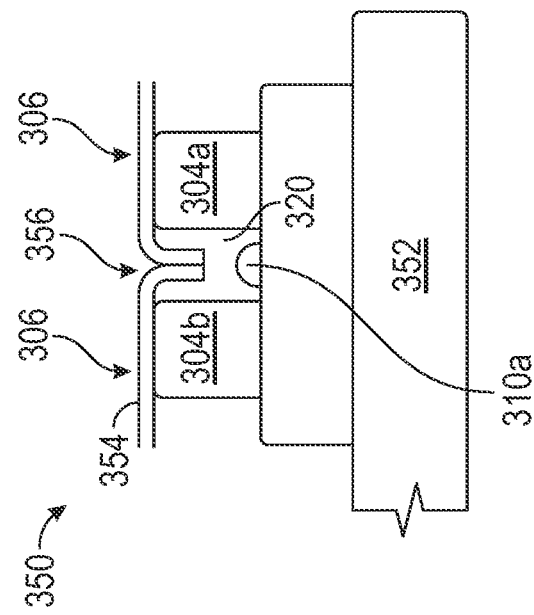
FIG. 3D illustrates the lift pad of FIGS. 3A-3C after the pad has been aligned and oriented with a lift point and features of the vehicle frame and the lift has been raised until the lift pad made contact with the lift point in the proper orientation.
Figure 3C:
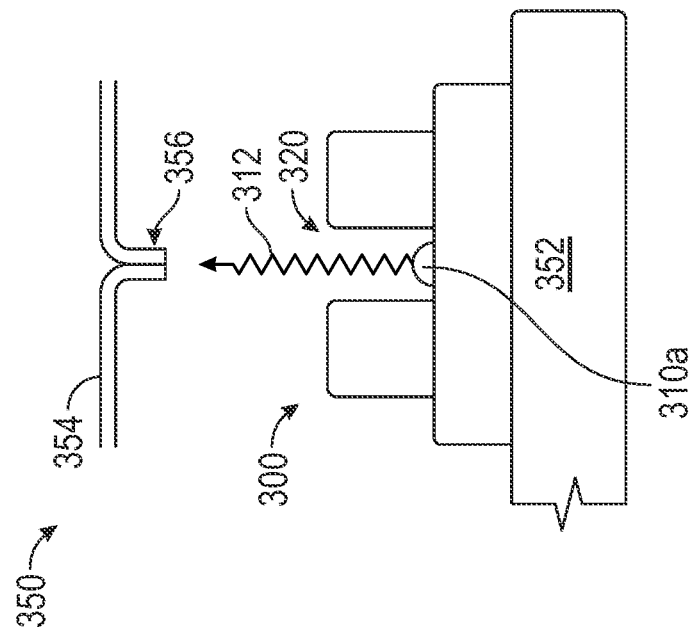
FIG. 3C illustrates the lift pad of FIGS. 3A and 3B in use and positioned below a frame of a vehicle to be lifted.

FIGS. 3C and 3D illustrate an example method of using lift pad 300 to a lift a vehicle 350. FIGS. 3C and 3D illustrate lift pad 300 positioned on a lift arm 352 of a vehicle lift, the lift pad may be removeably coupled to the lift arm, for example, by a bolt, pin or other coupling mechanism that allows for relative rotational movement between the lift pad and arm, or the lift pad may simply be placed on the arm. FIG. 3C shows lift pad 300 after it has been aligned by an operator with frame 354 of vehicle 350. Alignment beams 312 provide a light indication on frame 354 and are used to align recess 320 with a sensitive or other component of frame 354, in the illustrated example, a seam 356, to indicate a rotational and lateral alignment of recess 320 with respect to seam 356. As noted above, by providing at least two projection units 310 along recess 320, the alignment beams 312 provide an indication of the rotational position of the recess relative to seam 356 so that the lift pad can be quickly, objectively and easily aligned with the seam. As shown in FIG. 3D, after aligning lift pad 300 with frame 354 and seam 356, the operator can confidently raise lift arm 352 until lift pad contact surfaces 306 of body 304 come into contact with the frame and ensuring the seam 356 is safely disposed in recess 320.

Figure 3F:
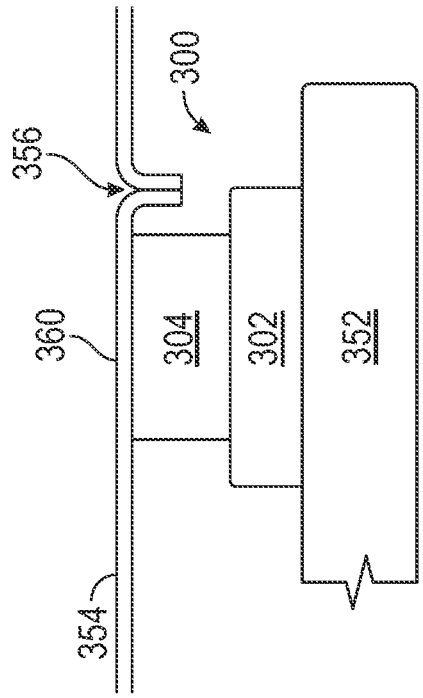
FIG. 3F illustrates the lift pad of FIGS. 3A-3E after the pad has been aligned and oriented with and relative to a lift point of the vehicle frame and its features and the lift has been raised until the lift pad made contact with the lift point.
Figure 3E:
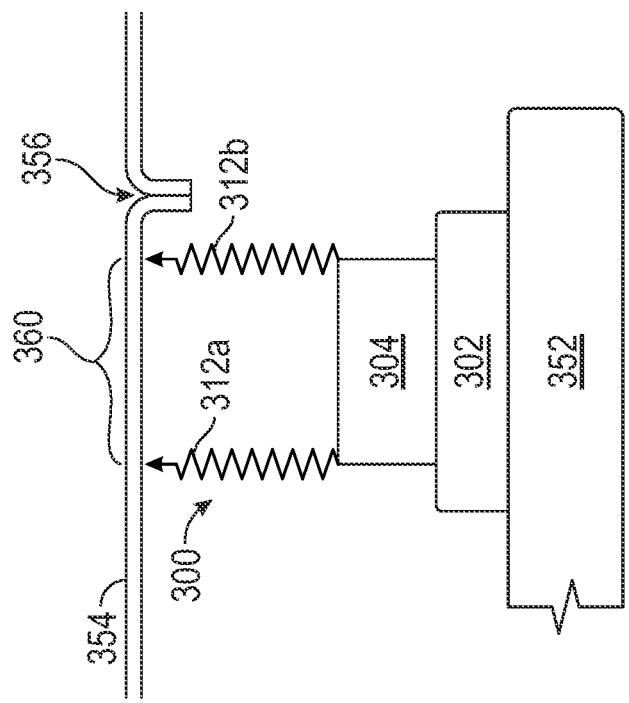
FIG. 3E illustrates the lift pad of FIGS. 3A-3D in use and positioned below a frame of a vehicle to be lifted.

FIGS. 3E and 3F illustrate another example method of using lift pad 300 to lift vehicle 350. FIG. 3E shows lift pad 300 after it has been aligned and oriented by an operator with frame 354 of vehicle 350. Alignment beams 312 provide a light indication on frame 354 and are used to align the contact surface of body 304 of lift pad 300 with a lift point 360 that is closely adjacent a sensitive or other component of frame 354, e.g., seam 356. As noted above, by providing projection units 310 at an outer extent of body 304, the alignment beams 312 provide an indication of the alignment and orientation of body with respect to the features of frame 354 and seam 356 so that the lift pad can be quickly and easily aligned and oriented with the lift point 360 features while avoiding the seam 356 or engaging it in the recess. As shown in FIG. 3F, after aligning and orienting lift pad 300 relative to and with the features of frame 354 and seam 356, the operator can confidently raise lift arm 352 until lift pad contact surfaces 306 of body 304 come into contact with the frame at lift point 360 and with the seam 356 safely avoided despite the seam being in close proximity to the lift point.

Figure 4B:
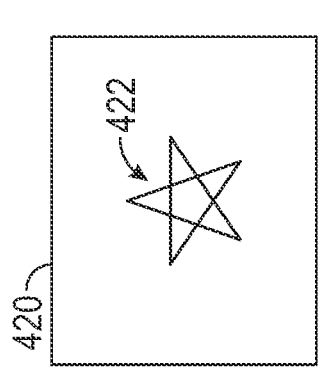
FIG. 4B is a front view of the target of FIG. 4A.
Figure 4C:
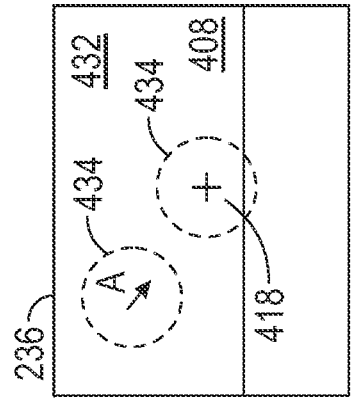
FIG. 4C illustrates a display of the computing device that is displaying images captured by an image capture device disposed in the lift pad of FIG. 4A.
Figure 4A:
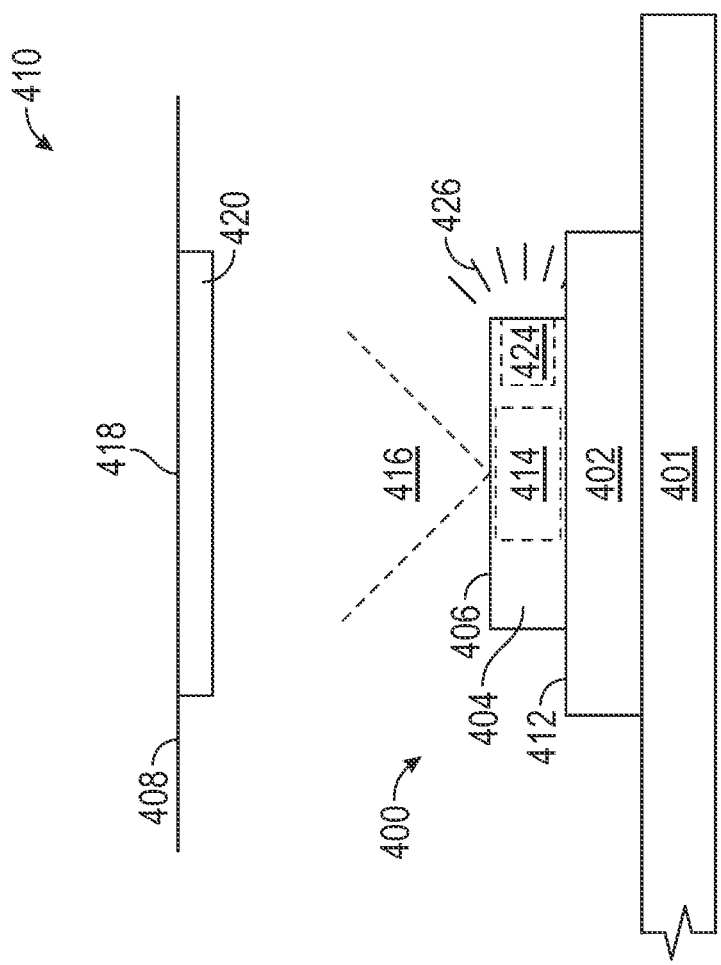
FIG. 4A illustrates a lift pad system including a side view of a lift pad shown in use below a vehicle frame to be lifted and a target coupled to a lift point and features of the vehicle frame.

FIG. 4 illustrates a side view of an example lift pad 400 made in accordance with the present disclosure that is positioned on a lift arm 401 of a lift. In the illustrated example, lift pad 400 includes a base 402 and a body 404 that stands proud of the base, the body defining a contact surface 406 configured to make contact with a vehicle frame 408 of a vehicle 410 and the base defining a recessed surface 412 that is recessed with respect to the contact surface 406. Body 404 is made of a durable material configured to come into contact with and support the weight of vehicle 410 and may be constructed from any material known in the art, including materials commonly used for conventional lift pads such as hard rubber. Base 402 may be integrally formed with body 404 or may be a separate component and may be made of the same or different material than body, such as hard rubber or metal. In other examples, lift pad 400 may not include base 402 and the lift pad may include body 404 configured to be directly coupled to or disposed on lift arm 401.

Lift pad 400 includes an ICD 414 having a FOV 416 for capturing images of vehicle frame 408 during alignment and orientation of the lift arm 401 and lift pad 400 with a lift point 418 on vehicle frame 408. ICD 414 may have any of the configurations and functionalities of ICD 232 described above in connection with FIG. 2 and lift pad 400 may have any of the components of lift pad 202 described above. In the illustrated example, ICD 414 is fully recessed within body below contact surface 406 and the contact surface includes a durable window (not illustrated) to allow the ICD to capture images. The durable window may be recessed or not recessed relative to the contact surface 406. Vehicle frame 408 includes a target 420 positioned at lift point 418. FIG. 4B shows a front view of target 420 and a symbol 422 printed on the target. Symbol 422 is shown as a star for simplicity and ease of illustration, however, symbol 422 may be in the form of any of the examples described above in connection with symbol 216 (FIG. 2). Target 420 may be removeably attached by an operator to vehicle frame 408, or may be an OEM component integrally formed with or removably attached to the vehicle frame.

ICD 414 is configured to capture images and in one example, lift pad 400 is configured to process the images with a machine vision program such as machine vision program 240 or transmit the images to a computing device such as computing device 206 (FIG. 2) for detection of symbol 422. Lift pad 400 may also include an alignment indicator 424 configured to emit a first audible and/or visual indication 464 when symbol 422 is detected and a second audible and/or visual indication when the lift pad is aligned and oriented as desired with lift point 418.

FIG. 4C illustrates a portion of display 236 of computing device 206 (FIG. 2) that is displaying images 432 captured by ICD 414. In the illustrated example, image 432 shows vehicle frame 408 and lift point 418, the lift point illustrated in this example by a cross on vehicle frame 408. ICD 414 or image processing software executed on a processor of the lift pad or computing device 206 is configured to augment the images with an indicator 434 indicating an alignment location of an outline of an outer extent of body 404 with respect to vehicle frame 408. FIG. 4C illustrates an example where lift pad 400 is initially not aligned or oriented with or relative to lift point 418 which is readily apparent from viewing display 236 and the operator can then move/rotate lift pad 400 and/or extend/retract/rotate lift arm 401, moving the indicator in the direction of arrow A until the indicator is centered on lift point 418, indicating lift pad 400 is aligned and oriented with and relative to the desired lift point. Lift pad 400, therefore, may be configured to execute a machine vision program to identify a symbol such as symbol 422 and to provide an indication of alignment with respect to the identified symbol and may also be configured to display images captured by ICD 414 and augment the images with an alignment indicator, such as indicator 434. In other examples, lift pads made in accordance with the present disclosure may include one or more ICDs that perform just the machine vision functionality or just the display with alignment indicator functionality. Lift pad 400 may also be used without target 420 to detect lift point 418 in images captured by ICD 414 and/or display images of lift point 418 captured by the ICD.

Figure 5:
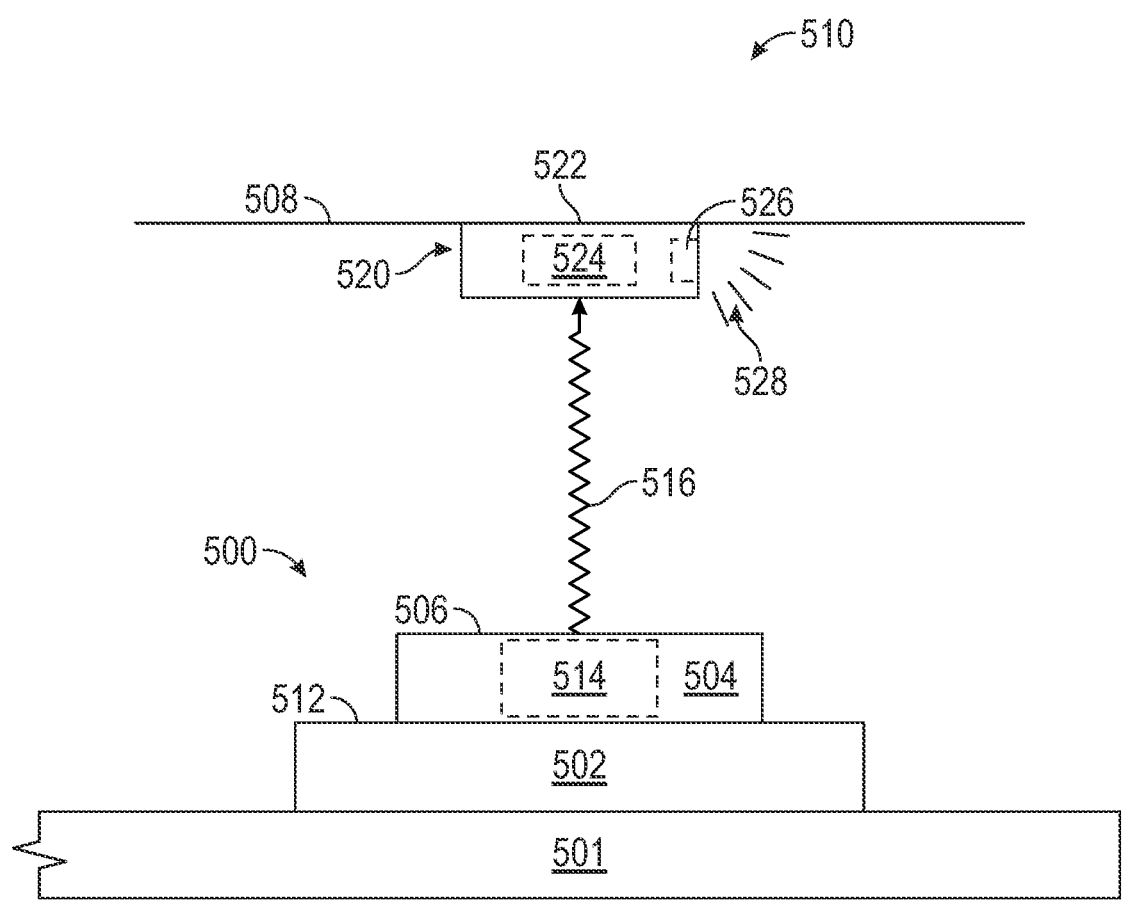
FIG. 5 illustrates a lift pad system including a side view of a lift pad shown in use below a vehicle frame to be lifted and a target coupled to a lift point of the vehicle frame.

FIG. 5 illustrates a side view of an example lift pad 500 made in accordance with the present disclosure that is positioned on a lift arm 501 of a lift. In the illustrated example, lift pad 500 includes a base 502 and a body 504 that stands proud of the base, the body defining a lift pad contact surface 506 configured to make contact with a vehicle frame 508 of a vehicle 510 and the base defining a recessed surface 512 that is recessed with respect to the lift pad contact surface 506. Body 504 is made of a durable material configured to come into contact with and support the weight of vehicle 510 and may be constructed from any material known in the art, including materials commonly used for conventional lift pads such as hard rubber. Base 502 may be integrally formed with body 504 or may be a separate component and may be made of the same or different material than body 504, such as hard rubber or metal. In other examples, base 502 may be omitted and lift pad 500 may include body 504 configured to be directly coupled to or disposed on lift arm 501.

Lift pad 500 includes a projection unit 514 that may have any of the configurations described herein, for example, any of the configurations of projection unit 208 of FIG. 2. In one example, projection unit 514 includes a laser diode and collimating optics for forming alignment beam 516 in the form of a collimated laser beam for forming a light indication in the form of a discrete spot of light on an opposing surface, such as vehicle frame 508. In the illustrated example, projection unit 514 is fully recessed within body 504 below lift pad contact surface 506 and the lift pad contact surface includes a durable window (not illustrated) to allow the projection unit 514 to project alignment beam 516. The durable window may be recessed or not recessed relative to the lift pad contact surface 506.

Frame 508 includes a target 520 positioned at lift point 522. Target 520 may have any of the components and functions of target 204 (FIG. 2). In the illustrated example, target 520 includes a laser beam position detector 524 for detecting a position of a laser beam incident on the detector, such as alignment beam 516, for indicating alignment and orientation. Laser beam position detector 524 may have any of a variety of configurations known in the art and in one example, the laser beam position detector includes photodiodes configured to provide an analog output directly proportional to the position of a light spot on the detector active area. Target 520 may include an alignment and orientation indicator 526 configured to receive a signal generated by laser beam position detector 524 and provide an indication of alignment and orientation, for example, in the form of a visual and/or audible indication 528 of alignment and orientation when alignment beam 516 is incident on detector 524 and approaches and then is aligned and oriented with and relative to lift point 522 and its features.

In one example, target 520 is configured to remain in place while vehicle 510 is lifted and may be removably coupled to lift point 522 by an operator or may be an OEM component integrally formed in or removably attached to vehicle 510. In other examples, target 520 may be designed to be removed from frame 508 after alignment and orientation and before lift arm 501 is raised to engage and lift the frame. In some examples, target 520 and lift pad 500 may have complementary three-dimensional shapes that are configured to become engaged when the lift pad makes contact with the target and lifts the vehicle. For non-limiting example, target may define a female recess having a cone shape (not illustrated) and contact surface 506 may define a male cone-shaped protrusion designed to be slidably inserted into the female recess in the target, or vice versa—a female recess in body 504 configured and dimensioned to receive a male protrusion in target 520 or the entirety of target 520.

Figure 6A:
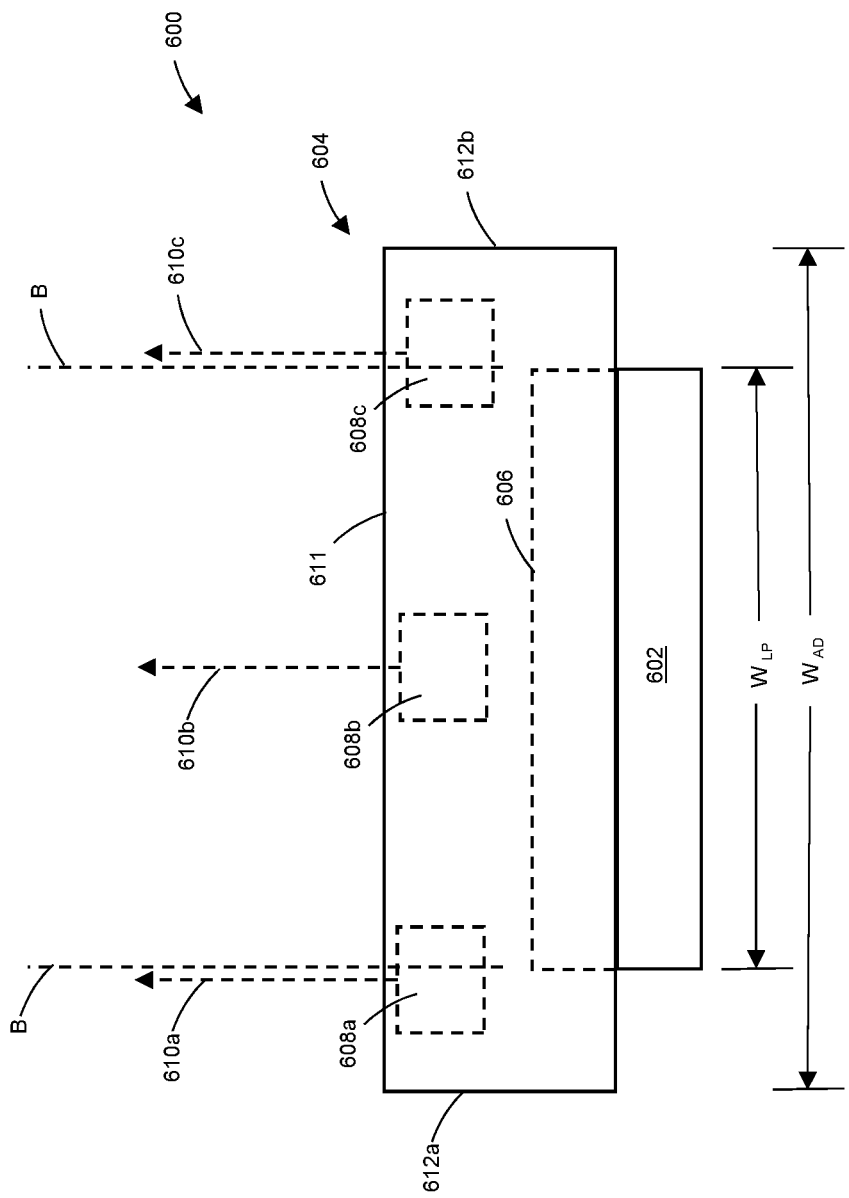
FIG. 6A is a side view of an alignment system including an alignment device removably disposed on a lift pad.
Figure 6C:
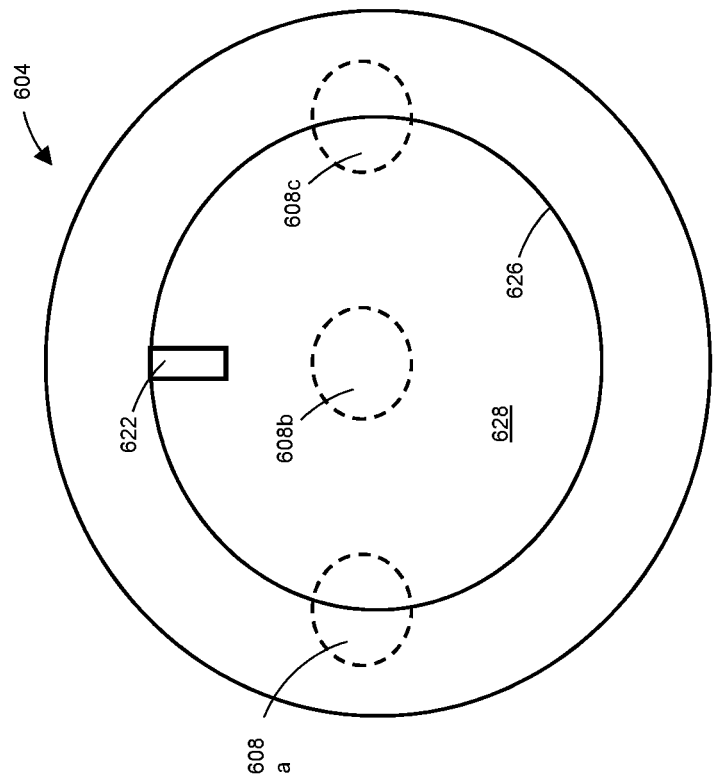
FIG. 6C is a bottom view of the alignment device of FIG. 6A.
Figure 6B:
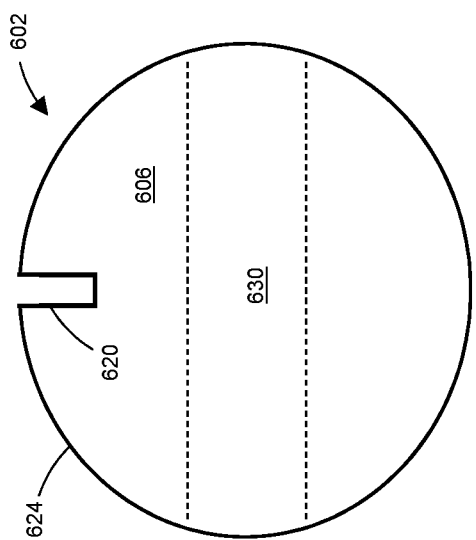
FIG. 6B is a top view of the lift pad of FIG. 6A.

FIGS. 6A-6C illustrate another example of a lift pad system 600 with alignment functionality that includes a lift pad 602 and an alignment device 604 configured to be disposed on the lift pad for aligning the lift pad with a lift point of an object, such as a vehicle. FIG. 6A is a side view of system 600 and shows alignment device 604 disposed on lift pad 602, the lift pad including a contact surface 606 configured to make contact with the features of an object being lifted. Lift pad 602 is made of a durable material configured to come into contact with and support the weight of a vehicle such as an automobile and may be constructed from any material known in the art, including materials commonly used for conventional lift pads such as hard rubber. In the illustrated example, alignment device 604 includes an alignment device recess 609 (FIG. 6C) that is configured and dimensioned to receive lift pad 602 such that the alignment device is slidably disposed over the lift pad and contact surface 606 is inserted into the alignment device.

Alignment device 604 includes a plurality of projection units 608a, 608b, and 608c disposed in the alignment device and that are each configured to project one or more alignment beams 610 from a top surface 611 of the alignment device for providing a light indication on an opposing surface, such as the underside of a vehicle when the alignment device is located beneath a vehicle to indicate a location on the opposing surface in alignment and oriented with the corresponding projection unit. Projection units 608 may have any of the configurations described herein, for example, any of the configurations of projection unit 208 of FIG. 2. In one example, each of projection units 608 include a laser diode and collimating optics for forming alignment beams 610 in the form of a collimated laser beam for forming a light indication in the form of at least one discrete spot of light on an opposing surface, such as a vehicle. Alignment device 604 has first and second opposing sides 612a, 612b and an outer width, $W_{AD}$, that is greater than an outer width, $W_{LP}$, of lift pad 602. FIG. 6A shows boundary lines B indicating an outer extent of contact surface 606. Projection units 608a and 608c are located proximate opposing sides 612a and 612b and configured so that alignment beams 610a and 610c are substantially aligned with or laterally outward of the outer extent of contact surface 606 for providing a light indication on an opposing surface to indicate a point on the opposing surface that is aligned with or laterally outward of the outer extent of the contact surface. In the illustrated example, alignment device 604 also includes a projection unit 608b located at the approximate center of alignment device 604 for projecting an alignment beam 610b for providing a light indication on an opposing surface that is aligned with the center of the alignment device and lift pad 602.

FIG. 6B illustrates a top view of lift pad 602 and FIG. 6C illustrates a bottom view of alignment device 604. Lift pad 602 and alignment device 604 include complementary mating features 620, 622 for ensuring alignment device 604 is positioned at the correct rotational orientation with respect to the lift pad. In the illustrated example, the alignment features include a slot 620 located in contact surface 606 and an outer wall 624 of lift pad 602 that is configured and dimensioned to receive a key 622 that extends from an inner wall 626, the inner wall defining alignment device recess 609. When alignment device 604 is being slidably disposed over lift pad 602, key 622 is slid into slot 620 and ensures the alignment device is at the correct rotational orientation.

In other examples, any other combination of complementary mating features may be used, such as one or more male protrusions (not illustrated) that protrude from inner surface 628 that may be inserted into complementary recesses (not illustrated) in contact surface 606 when the alignment device is disposed on the lift pad.

As shown in FIG. 6B, lift pad may optionally include an elongate recess (illustrated by dotted line) that is configured and dimensioned to receive a feature of the object when contact surface 606 contacts the object in a similar fashion to other lift pads disclosed herein. In such examples, features 620 and 622 may be used to ensure alignment beams 610 are aligned with elongate recess 630 to assist with adjusting a rotational position of lift pad 602 to align the recess with a feature of an object, such as a seam of a vehicle frame. In the illustrated example, inner wall 626 of alignment device recess 609 has a complementary shape and size to outer wall 624 of the lift pad, and in the illustrated example, both have a circular shape, such that when the alignment device is disposed over the lift pad, the alignment device is centered on the lift pad so that alignment beam 610b (FIG. 6A) provides an alignment indication for the center of the lift pad. In other examples, inner wall 626 and outer wall 624 may have any shape, such as square, rectangular, triangular, etc. In other examples, alignment device 604 may have more or fewer projection units 608 and corresponding alignment beams 610, for example, only one projection unit 608 located, for example, at the center of the alignment device, or one or more projection units configured to project a plurality of alignment beams, such as one or more beams forming a light indication in the form of a plurality of lines or one or more shapes on an opposing surface. For example, alignment device 604 may be configured to project an alignment beam that forms a light indication in the form of a circle indicating an alignment location of an outer extent of contact surface 606.

Alignment device 604 is configured to be temporarily disposed on lift pad 602 to align the light pad and a lifting device the lift pad is disposed on with a lift point of an object. After alignment, alignment device 604 can be removed before lifting the lift pad to contact and lift the object. Alignment device may be made from any of a variety of materials, such as metal, plastic, rubber, or any combination thereof. In examples where alignment device 604 is configured to be removed from lift pad 602 prior to lifting a vehicle, the alignment device does not need to be able to withstand the weight of a vehicle or other heavy object. In some examples, a single alignment device 604 can be used to sequentially align a plurality of lift pads 602 with corresponding lift points, such that only one alignment device 604 is required to align all of the lift pads. Thus, lift pad 602 may have a simple design and construction and in some examples, may be a conventional prior art lift pad 104 (FIG. 1A), for example, a simple unitary piece of hard rubber that may optionally include one or more recesses. In the illustrated example, as noted above, lift pad 602 includes a mating feature 620 for mating with a complementary mating feature of alignment device 604.

In one example of the present disclosure, a kit is provided that include an alignment device, such as alignment device, 604 and at least one lift pad, such as lift pad 602 or any conventional lift pad, such as prior art lift pad 104.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
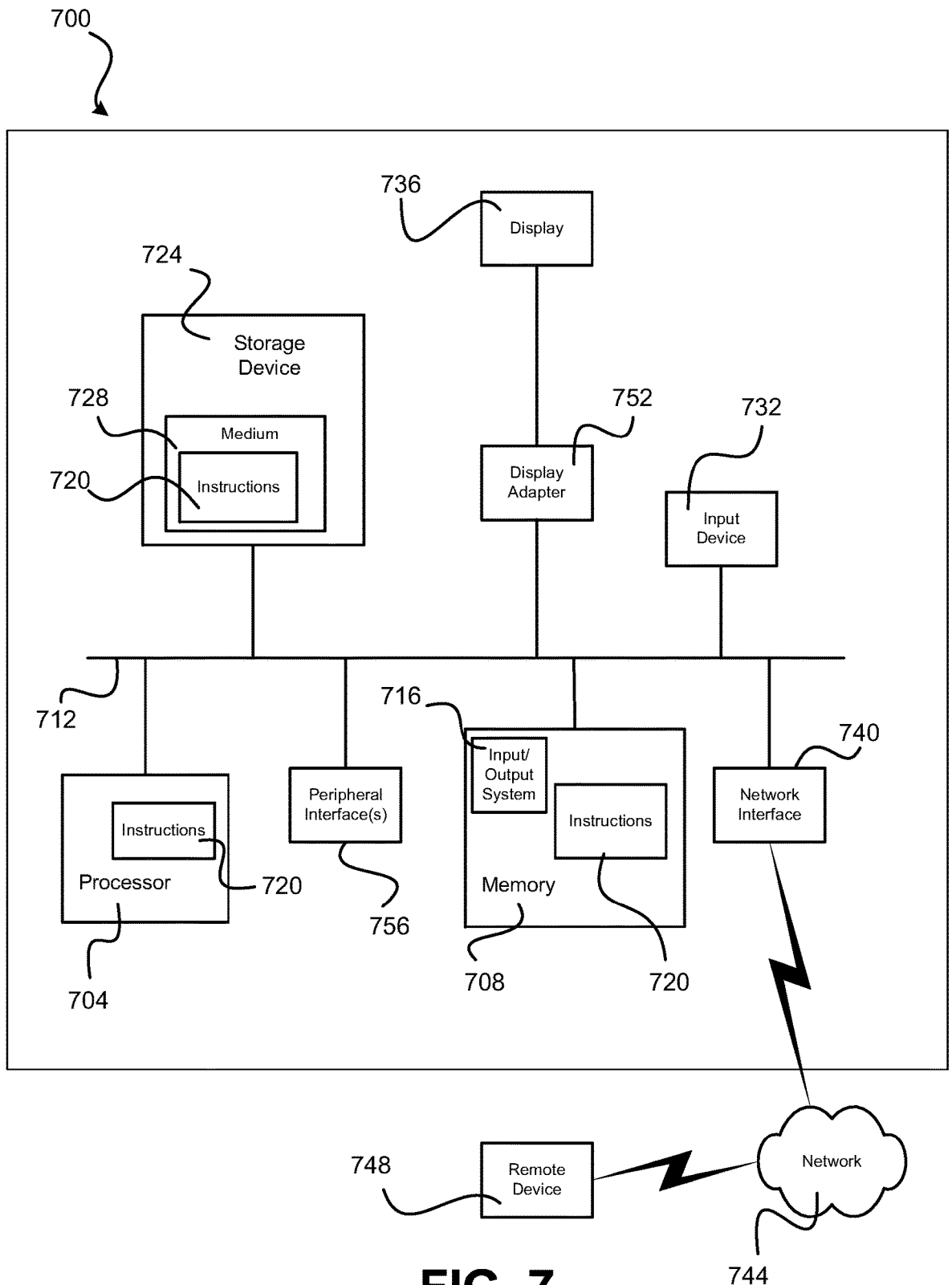
FIG. 7 is a functional block diagram of an example computing device that may be used to perform one or more aspects of the present disclosure.

FIG. 7 shows a diagrammatic representation of one embodiment of a computing device in the exemplary form of a computer system 700 within which a set of instructions for causing a lift pas system, such as the lift pad system of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. A method of lifting an object with a lifting device and a lift pad, the lift pad having a projection unit and a body that includes a contact surface, the contact surface configured to make contact with the object when the lift pad is disposed on the lifting device or make contact with the lifting device when the lift pad is coupled to the object, the method comprising:
    positioning the lifting device below the object, wherein the lift pad is disposed on the lifting device or coupled to the object;
    projecting an alignment beam from the projection unit, the alignment beam forming a light indication on an opposing surface, the light indication indicating at least one of:
        a point on the opposing surface that is aligned with an outer extent of the contact surface;
        a point on the opposing surface that is laterally outward of the outer extent of the contact surface;
        a rotational position of the lift pad with respect to the opposing surface; or
        a point on the object that is aligned with a feature in the lift pad, the feature configured and dimensioned to receive a feature of the object when the contact surface contacts the object;
    adjusting a position of the lifting device until the light indication illuminates a portion of the lifting device or object corresponding to an alignment of the lifting device with a lift point of the object;
    raising the lifting device until the lift pad makes contact with the lift point or the lifting device makes contact with the lift pad; and
    lifting the object with the lifting device.

2. The method of claim 1, wherein the projecting an alignment beam includes projecting a plurality of alignment beams from one or more corresponding respective projection units, wherein the plurality of alignment beams are substantially perpendicular to and disposed along at least one of a length of the feature in the lift pad and around the outer extent of the contact surface.

3. The method of claim 1, wherein the light indication indicates a point on the object that is substantially aligned with an intersection of a central longitudinal axis of the feature in the lift pad and the outer extent of the contact surface.

4. The method of claim 1, wherein the lift pad includes a base, wherein the base defines a surface that is recessed with respect to the contact surface.

5. The method of claim 4, wherein the base surface extends laterally outward from the outer extent of the contact surface.

6. The method of claim 1, further comprising detecting a location of incidence of the alignment beam on a beam position detector operably coupled to the lifting device, the lift pad or the object.

7. The method of claim 1, wherein the projection unit is disposed in an alignment device, the method further comprising:
    removably disposing the alignment device on the lift pad or lifting device; and
    removing the alignment device from the lift pad or lifting device without moving the lift pad or lifting device before the step of raising the lifting device.

8. The method of claim 1, wherein the object is an automobile, truck, airplane, boat, mobile home, trailer, prefabricated home, or motorcycle.

9. The method of claim 1, wherein the object weighs more than 2,000 lbs.

10. A method of lifting an object with a lifting device and an alignment device, the alignment device having a projection unit, the method comprising:
- positioning the lifting device below the object, wherein the alignment device is disposed on the lifting device or coupled to the object;
- projecting an alignment beam from the projection unit, the alignment beam forming a light indication on an opposing surface,
- adjusting a position of the lifting device until the light indication illuminates a portion of the lifting device or object corresponding to an alignment of the lifting device with a lift point of the object;
- removing the alignment device from the lifting device or the object;
- raising the lifting device until the lifting device makes contact with the object; and
- lifting the object with the lifting device.

11. The method of claim 10, wherein the lifting device includes a lift pad having a contact surface configured to make contact with the object, the method further comprising positioning the alignment device on the lift pad, wherein the step of removing includes removing the alignment device from the lift pad before the lifting device and lift pad make contact with the object.

12. The method of claim 11, wherein the alignment device includes a top side and a bottom side and a recess in the bottom side, wherein the step of positioning the alignment device on the lift pad includes positioning the alignment device on the lift pad so that the lift pad is at least partially disposed in the recess.

* * * * *